United States Patent
Terashima et al.

(10) Patent No.: US 12,128,843 B2
(45) Date of Patent: Oct. 29, 2024

(54) OCCUPIED SEAT DETECTION DEVICE, OCCUPIED SEAT DETECTION METHOD, AND NON-TRANSITORY COMPUTER-READABLE RECORDING MEDIUM

(71) Applicant: Panasonic Intellectual Property Corporation of America, Torrance, CA (US)

(72) Inventors: Yuki Terashima, Osaka (JP); Toshiyuki Matsumura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 221 days.

(21) Appl. No.: 17/840,071

(22) Filed: Jun. 14, 2022

(65) Prior Publication Data

US 2022/0314917 A1     Oct. 6, 2022

Related U.S. Application Data

(63) Continuation of application No. PCT/JP2021/021384, filed on Jun. 4, 2021.

(30) Foreign Application Priority Data

Jun. 18, 2020   (JP) .................. 2020-105431

(51) Int. Cl.
  *B60R 21/00*   (2006.01)
  *B60N 2/00*    (2006.01)
  *B60R 21/015*  (2006.01)

(52) U.S. Cl.
  CPC .......... *B60R 21/0153* (2014.10); *B60N 2/002* (2013.01)

(58) Field of Classification Search
  CPC .......... B60R 21/0153; B60R 21/01536; B60R 21/00; B60N 2/002; G01S 15/04; G01S 15/08
  (Continued)

(56) References Cited

U.S. PATENT DOCUMENTS

| 6,029,105 A | 2/2000 | Schweizer |
| 10,647,251 B2 * | 5/2020 | Hwang ................. G01S 7/524 |

(Continued)

FOREIGN PATENT DOCUMENTS

| JP | 11-151970 | 6/1999 |
| JP | 2000-16233 | 1/2000 |

(Continued)

OTHER PUBLICATIONS

International Search Report (ISR) issued on Aug. 24, 2021 in International (PCT) Application No. PCT/JP2021/021384.

(Continued)

*Primary Examiner* — Hai H Huynh
(74) *Attorney, Agent, or Firm* — Wenderoth, Lind & Ponack, L.L.P.

(57) ABSTRACT

An occupied seat detection device includes: at least one receiver that is disposed in a space including a plurality of seats and receives at least one of sound generated inside the space or sound generated outside the space; an acoustic characteristics analyzer that calculates, from a signal received by the at least one receiver, temporal characteristics or frequency characteristics of the sound in the space; and a detector that detects whether an occupant is present or whether an occupied seat is present inside the space, based on the temporal characteristics or the frequency characteristics calculated by the acoustic characteristics analyzer, and outputs a detection result.

11 Claims, 11 Drawing Sheets

(58) Field of Classification Search
USPC .................................................... 701/45–49
See application file for complete search history.

(56) References Cited

U.S. PATENT DOCUMENTS

| | | | |
|---|---|---|---|
| 2002/0082756 A1* | 6/2002 | Breed ............... | B60R 21/01516 |
| | | | 701/45 |
| 2004/0240676 A1 | 12/2004 | Hashimoto et al. | |
| 2019/0184899 A1 | 6/2019 | Hwang | |
| 2021/0084212 A1 | 3/2021 | Tamura | |

FOREIGN PATENT DOCUMENTS

| | | |
|---|---|---|
| JP | 2006-69454 | 3/2006 |
| JP | 2012-190329 | 10/2012 |
| JP | 2019-138671 | 8/2019 |
| WO | 97/09639 | 3/1997 |
| WO | 2015/074685 | 5/2015 |

OTHER PUBLICATIONS

Extended European Search Report issued Oct. 30, 2023 in corresponding European Patent Application No. 21827043.7.

* cited by examiner

Center line

Traveling direction

FIG. 11

| | Condition | Training data | Correct label |
|---|---|---|---|
| Learning model A | Door closing event occurs in left front door when all the other doors are closed | Temporal characteristics or frequency characteristics of sound in space inside of vehicle that are outputted from acoustic characteristics analyzer when left front door is closed with all the other doors closed | No occupant, one person in driver's seat, one person in front passenger seat, one person in rear seat on the right, one person in rear seat on the left, total of two persons in driver's seat and front passenger seat, total of two persons in driver's seat, rear seat on the right, ... |
| Learning model B | Door closing event occurs in right front door when all the other doors are closed | Temporal characteristics or frequency characteristics of sound in space inside of vehicle that are outputted from acoustic characteristics analyzer when right front door is closed with all the other doors closed | No occupant, one person in driver's seat, one person in front passenger seat, one person in rear seat on the right, one person in rear seat on the left, total of two persons in driver's seat and front passenger seat, total of two persons in driver's seat, rear seat on the right, ... |
| Learning model C | Door closing event occurs in left rear door when all the other doors are closed | Temporal characteristics or frequency characteristics of sound in space inside of vehicle that are outputted from acoustic characteristics analyzer when left rear door is closed with all the other doors closed | No occupant, one person in driver's seat, one person in front passenger seat, one person in rear seat on the right, one person in rear seat on the left, total of two persons in driver's seat and front passenger seat, total of two persons in driver's seat, rear seat on the right, ... |
| ... | ... | ... | ... |
| Learning model N | Door closing event occurs in hatch when all the other doors are closed | Temporal characteristics or frequency characteristics of sound in space inside of vehicle that are outputted from acoustic characteristics analyzer when hatch is closed with all the other doors closed | No occupant, one person in driver's seat, one person in front passenger seat, one person in rear seat on the right, one person in rear seat on the left, total of two persons in driver's seat and front passenger seat, total of two persons in driver's seat, rear seat on the right, ... |

OCCUPIED SEAT DETECTION DEVICE, OCCUPIED SEAT DETECTION METHOD, AND NON-TRANSITORY COMPUTER-READABLE RECORDING MEDIUM

CROSS REFERENCE TO RELATED APPLICATIONS

This is a continuation application of PCT International Application No. PCT/JP2021/021384 filed on Jun. 4, 2021, designating the United States of America, which is based on and claims priority of Japanese Patent Application No. 2020-105431 filed on Jun. 18, 2020. The entire disclosures of the above-identified applications, including the specifications, drawings and claims are incorporated herein by reference in their entirety.

FIELD

The present disclosure relates to a technology for detecting whether an occupant is present or whether an occupied seat is present.

BACKGROUND

A technology has been known for detecting whether an occupant is present or whether an occupied seat is present (for example, see Patent Literatures (PTLs) 1 through 4).

CITATION LIST

Patent Literature

PTL 1: Japanese Unexamined Patent Application Publication No. 2006-69454
PTL 2: Japanese Unexamined Patent Application Publication No. 11-151970
PTL 3: Japanese Unexamined Patent Application Publication No. 2000-16233
PTL 4: Japanese Unexamined Patent Application Publication No. 2019-138671

SUMMARY

Technical Problem

The technologies disclosed in PTL 1 and PTL 2 have a problem that sensors, etc. need to be embedded in each seat to be detected. The technology disclosed in PTL 3 has a problem that a single set of sensors, etc. detect the presence or absence of only a single occupied seat. The technology disclosed in PTL 4 has a problem that memory load is relatively high because of the necessity to perform image processing using a camera.

The present disclosure has been conceived in view of the above problems, and its aim is to provide an occupied seat detection device that: does not require sensors to be embedded in each seat to be detected; is capable of detecting, by a single set of sensors, whether an occupant is present or whether an occupied seat is present in at least two seats; and does not need to perform image processing using a camera.

Solution to Problem

The occupied seat detection device according to an aspect of the present disclosure includes: at least one receiver that is disposed in a space including a plurality of seats and receives at least one of sound generated inside the space or sound generated outside the space; an acoustic characteristics analyzer that calculates, from a signal received by the at least one receiver, temporal characteristics or frequency characteristics of the sound in the space; and a detector that detects whether an occupant is present or whether an occupied seat is present inside the space, based on the temporal characteristics or the frequency characteristics calculated by the acoustic characteristics analyzer, and outputs a detection result.

The occupied seat detection method according to an aspect of the present disclosure is an occupied seat detection method performed by an occupied seat detection device that includes a transmitter, at least one receiver, an acoustic characteristics analyzer, and a detector. The occupied seat detection method includes: transmitting one after another predetermined sounds to inside a space, the transmitting being performed by the transmitter; receiving one after another reflected waves of the predetermined sounds transmitted by the transmitter, the receiving being performed by the at least one receiver; based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer; and detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector.

The non-transitory computer-readable recording medium according to an aspect of the present disclosure is a non-transitory computer-readable recording medium having recorded thereon a program for causing an occupied seat detection device to perform occupied seat detection processes included in the program, where the occupied seat detection device includes a transmitter, at least one receiver, an acoustic characteristics analyzer, and a detector. The occupied seat detection processes include: transmitting one after another predetermined sounds to inside a space, the transmitting being performed by the transmitter; receiving one after another reflected waves of the predetermined sounds transmitted by the transmitter, the receiving being performed by the at least one receiver; based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer; and detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector.

Advantageous Effects

According to the occupied seat detection device, the occupied seat detection method, and the non-transitory computer-readable recording medium according to the present disclosure, it is possible to provide an occupied seat detection device that: does not require sensors, etc. to be embedded in each seat to be detected; is capable of detecting, by a single set of sensors, etc., whether an occupant is present or whether an occupied seat is present in at least two seats; and does not need to perform image processing using a camera.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 11 is a schematic diagram showing an exemplary correspondence between training data used for training each learning model according to Embodiment 4, a condition satisfied by such training data, and the correct label assigned to the training data.

DESCRIPTION OF EMBODIMENTS

Figure 1:
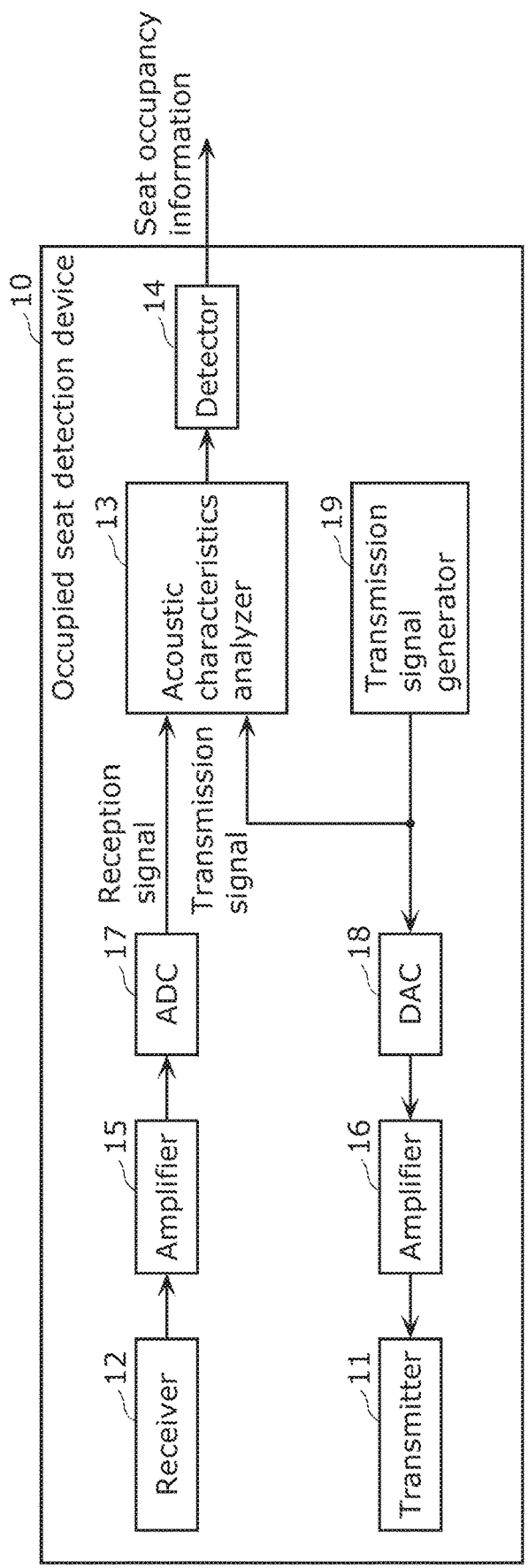
FIG. 1 is a block diagram showing the configuration of an occupied seat detection device according to Embodiment 1.

Background Behind Arriving at an Aspect of the Present Disclosure

Through the study on occupied seat detection devices that detect whether an occupied seat is present in a space that includes a plurality of seats, the present inventors have arrived at the following finding: when impulse responses of the inside of the space that are in response to ultrasonic waves are sequentially calculated, using an ultrasonic transmitter and an ultrasonic receiver disposed inside the space, a difference is present between calculated impulse responses when a person's movement is present. Such finding of the present inventors is more specifically described as follows: when a person's movement is present between a first timing and a second timing, a difference is present between a first impulse response calculated on the basis of a predetermined ultrasonic wave transmitted by the transmitter at the first timing and a second impulse response calculated on the basis of a predetermined ultrasonic wave transmitted by the transmitter at the second timing, even when such movement is relatively small such as a person's movement caused by breathing. The present inventors further conducted the study on the basis of the foregoing finding to conceive the occupied seat detection device and so forth described below that do not require sensors, etc. to be embedded in each seat to be detected; are capable of detecting, by a single set of sensors, etc., whether an occupant is present or whether an occupied seat is present in at least two seats; and do not need to perform image processing using a camera.

The occupied seat detection device according to an aspect of the present disclosure includes: at least one receiver that is disposed in a space including a plurality of seats and receives at least one of sound generated inside the space or sound generated outside the space; an acoustic characteristics analyzer that calculates, from a signal received by the at least one receiver, temporal characteristics or frequency characteristics of the sound in the space; and a detector that detects whether an occupant is present or whether an occupied seat is present inside the space, based on the temporal characteristics or the frequency characteristics calculated by the acoustic characteristics analyzer, and outputs a detection result.

In the foregoing occupied seat detection device, the temporal characteristics or the frequency characteristics of sound inside the space that include a plurality of seats reflect whether an occupant is present or whether an occupied seat is present in the space.

According to the foregoing occupied seat detection device, it is thus possible to provide an occupied seat detection device that: does not require sensors, etc. to be embedded in each seat to be detected; is capable of detecting, by a single set of sensors, whether an occupant is present or whether an occupied seat is present in at least two seats; and does not need to perform image processing using a camera.

Also, the occupied seat detection device may further include: a transmitter that transmits a predetermined sound to inside the space. Here, the at least one receiver may receive a reflected wave of the predetermined sound, the acoustic characteristics analyzer may calculate, from a signal of the predetermined sound and the signal received by the at least one receiver, the temporal characteristics or the frequency characteristics based on the predetermined sound, and the detector may detect whether an occupant is present or whether an occupied seat is present, based on a difference between (i) the temporal characteristics or the frequency characteristics calculated by the acoustic characteristics analyzer based on the predetermined sound transmitted by the transmitter at a first timing and (ii) the temporal characteristics or the frequency characteristics calculated by the acoustic characteristics analyzer based on the predetermined sound transmitted by the transmitter at a second timing.

In the foregoing occupied seat detection device, when a person's movement is present between the first timing and the second timing, a difference is present between the temporal characteristics or the frequency characteristics corresponding to the first timing calculated by the acoustic characteristics analyzer, and the temporal characteristics or the frequency characteristics corresponding to the second timing calculated by the acoustic characteristics analyzer, even when such movement is relatively small such as a person's movement caused by breathing.

For this reason, the foregoing occupied seat detection device is capable of more accurately detecting whether an occupant is present or whether an occupied seat is present.

Also, the predetermined sound transmitted by the transmitter may be an ultrasonic wave.

With this, it is possible to reduce discomfort that can be felt by a person in the space because of sound transmitted by the transmitter.

Also, the transmitter may be disposed in a position from which the transmitter is able to transmit sound to all of the plurality of seats inside the space.

With this, it is possible to detect whether an occupant is present or whether an occupied seat is present for all the seats inside the space.

Also, the space may be an internal space of a vehicle, at least one of the transmitter or the at least one receiver may be disposed in a position that is off a center line of the vehicle which extends in a traveling direction of the vehicle, and when the center line serves as a symmetric axis, the transmitter may not be disposed in an axially symmetrical position with the at least one receiver.

With this, it is possible for the following timings to be mutually different from each other in the at least one receiver: the timing of receiving a reflected wave from a person who is seated in one of the two seats located at axially symmetrical positions when the center line serves as a symmetric axis; and the timing of receiving a reflected wave from a person who is seated in the other of the two seats. This enables a distinction between one of the two seats and the other seat to detect whether an occupied seat is present. In particular, when the space is a vehicle, it is consequently possible to detect whether an occupant or an occupied seat is present in all of the seats in the vehicle in which the seats are located in bilaterally symmetrical positions.

Also, the space may be a vehicle, and the transmitter and the at least one receiver may be disposed inside an overhead console of the vehicle.

With this configuration in which the occupied seat detection device is located in a position from which all the seats are viewable, it is possible to more effectively detect whether an occupant or an occupied seat is present.

Also, the at least one receiver may include a plurality of receivers, and the acoustic characteristics analyzer may calculate the temporal characteristics or the frequency characteristics by performing directionality control that uses at least two of a plurality of reception signals received by the plurality of receivers, each of the plurality of reception signals representing a waveform of the reflected wave.

This enables a distinction between positions of a plurality of seats to detect whether an occupant is present or whether an occupied seat is present.

When a difference that is greater than or equal to a predetermined value is present between the temporal characteristics or the frequency characteristics calculated by the acoustic characteristics analyzer based on the predetermined sound transmitted by the transmitter at the first timing and the temporal characteristics or the frequency characteristics calculated by the acoustic characteristics analyzer based on the predetermined sound transmitted by the transmitter at the second timing, the detector may further calculate a position of the occupied seat from a position, on a temporal axis in the temporal characteristics or the frequency characteristics, where the difference is present.

With this, it is possible to detect the position of an occupied seat.

Also, the transmitter and at least one of the at least one receiver may be a speaker and a microphone, respectively, used in an in-vehicle emergency call system.

With this, it is possible to reduce the number of speakers and the number of microphones equipped in the vehicle.

Also, the detector may transmit, using a communication device used in the in-vehicle emergency call system, information relating to whether the occupied seat is present detected inside the space to an emergency call center connected to an in-vehicle emergency call system.

With this, it is possible to transmit, to the emergency call center, information relating to whether an occupied seat is present in the event of an emergency in the vehicle such as a traffic accident. This enables effective emergency aid activities.

The occupied seat detection method according to an aspect of the present disclosure is an occupied seat detection method performed by an occupied seat detection device that includes a transmitter, at least one receiver, an acoustic characteristics analyzer, and a detector. Such occupied seat detection method includes: transmitting one after another predetermined sounds to inside a space, the transmitting being performed by the transmitter; receiving one after another reflected waves of the predetermined sounds transmitted by the transmitter, the receiving being performed by the at least one receiver; based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer; and detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector.

In the occupied seat detection device that performs the foregoing occupied seat detection method, the temporal characteristics or the frequency characteristics of sound inside the space that include a plurality of seats reflect whether an occupant is present or whether an occupied seat is present in the space.

According to the foregoing occupied seat detection method, it is thus possible to provide an occupied seat detection device that: does not require sensors to be embedded in each seat to be detected; is capable of detecting, by a single set of sensors, whether an occupant is present or whether an occupied seat is present in at least two seats; and does not need to perform image processing using a camera.

The non-transitory computer-readable recording medium according to an aspect of the present disclosure is a non-transitory computer-readable recording medium having recorded thereon a program for causing an occupied seat detection device to perform occupied seat detection processes included in the program, where the occupied seat detection device includes a transmitter, at least one receiver, an acoustic characteristics analyzer, and a detector. The occupied seat detection processes include: transmitting one after another predetermined sounds to inside a space, the transmitting being performed by the transmitter; receiving one after another reflected waves of the predetermined sounds transmitted by the transmitter, the receiving being performed by the at least one receiver; based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer; and detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector.

In the occupied seat detection device that performs occupied seat detection processes using the foregoing non-transitory computer-readable recording medium, the temporal characteristics or the frequency characteristics of sound inside the space that include a plurality of seats reflect whether an occupant is present or whether an occupied seat is present in the space.

According to the foregoing non-transitory computer-readable recording medium, it is thus possible to provide an occupied seat detection device that: does not require sensors to be embedded in each seat to be detected; is capable of detecting, by a single set of sensors, whether an occupant is present or whether an occupied seat is present in at least two seats; and does not need to perform image processing using a camera.

Hereinafter, certain exemplary embodiments of the occupied seat detection device according to an aspect of the present disclosure are described with reference to the accompanying Drawings. Each of the exemplary embodiments described below shows a general or specific example. The numerical values, shapes, elements, the arrangement and connection of the elements, steps (processes), the processing order of the steps etc. shown in the following exemplary embodiments are mere examples, and therefore do not limit the scope of the present disclosure. The drawings are schematic views, and are not always strictly drawn.

Note that general or specific aspects of the present disclosure may be implemented using a system, a method, an integrated circuit, a computer program, or a computer-readable recording medium such as a CD-ROM, or any combination of systems, methods, integrated circuits, computer programs, or computer-readable recording media.

Embodiment 1

Hereinafter, the occupied seat detection device according to Embodiment 1 is described in greater detail with reference to the accompanying Drawings. The occupied seat detection device is disposed in a space that includes a plurality of seats and detects whether an occupant is present or whether an occupied seat is present in the space. Examples of the space that includes a plurality of seats may include a vehicle which is an automobile, a vehicle which carries many passengers, a bus, a train, an aircraft, and a room. The present embodiment describes a vehicle which is an automobile as an exemplary space that includes a plurality of seats, but the space that includes a plurality of seats does not need to be limited to a vehicle which is an automobile.

Configuration

FIG. 1 is a block diagram showing the configuration of occupied seat detection device 10 according to Embodiment 1.

As shown in FIG. 1, occupied seat detection device 10 includes transmitter 11, receiver 12, acoustic characteristics analyzer 13, detector 14, amplifier 15, amplifier 16, analog to digital converter (ADC) 17, digital to analog converter (DAC) 18, and transmission signal generator 19.

When an electrical signal is inputted, transmitter 11 converts the inputted electrical signal into sound, and transmits the resulting sound to inside the vehicle where occupied seat detection device 10 is disposed. In the following description of Embodiment 1, the sound obtained by a conversion performed by transmitter 11, that is, the sound transmitted by transmitter 11 is ultrasonic waves, but the sound transmitted by the transmitter is not necessarily limited to ultrasonic waves. Transmitter 11 is implemented by, for example, a speaker. Transmitter 11 may also be implemented by, for example, a piezoelectric device. Transmitter 11 transmits a predetermined ultrasonic wave when receiving an input of a transmission signal to be described later.

Receiver 12 receives the sound transmitted from transmitter 11 and its reflected wave, converts the received sound and its reflected wave into a reception signal that is an analog electrical signal, and outputs the resulting reception signal. In the following description of Embodiment 1, the sound and its reflected wave received by receiver 12 are ultrasonic waves, but the sound and its reflected wave received by receiver 12 are not necessarily limited to ultrasonic waves. Receiver 12 is implemented by, for example, a microphone. Receiver 12 may also be implemented by, for example, a piezoelectric device. When implemented by piezoelectric devices, transmitter 11 and receiver 12 may be implemented by a single piezoelectric device that performs time-division operations.

In the present description, occupied seat detection device 10 includes a single receiver 12, but occupied seat detection device 10 does not need to be limited to including a single receiver, and thus may be configured to include a plurality of receivers.

Figure 2:
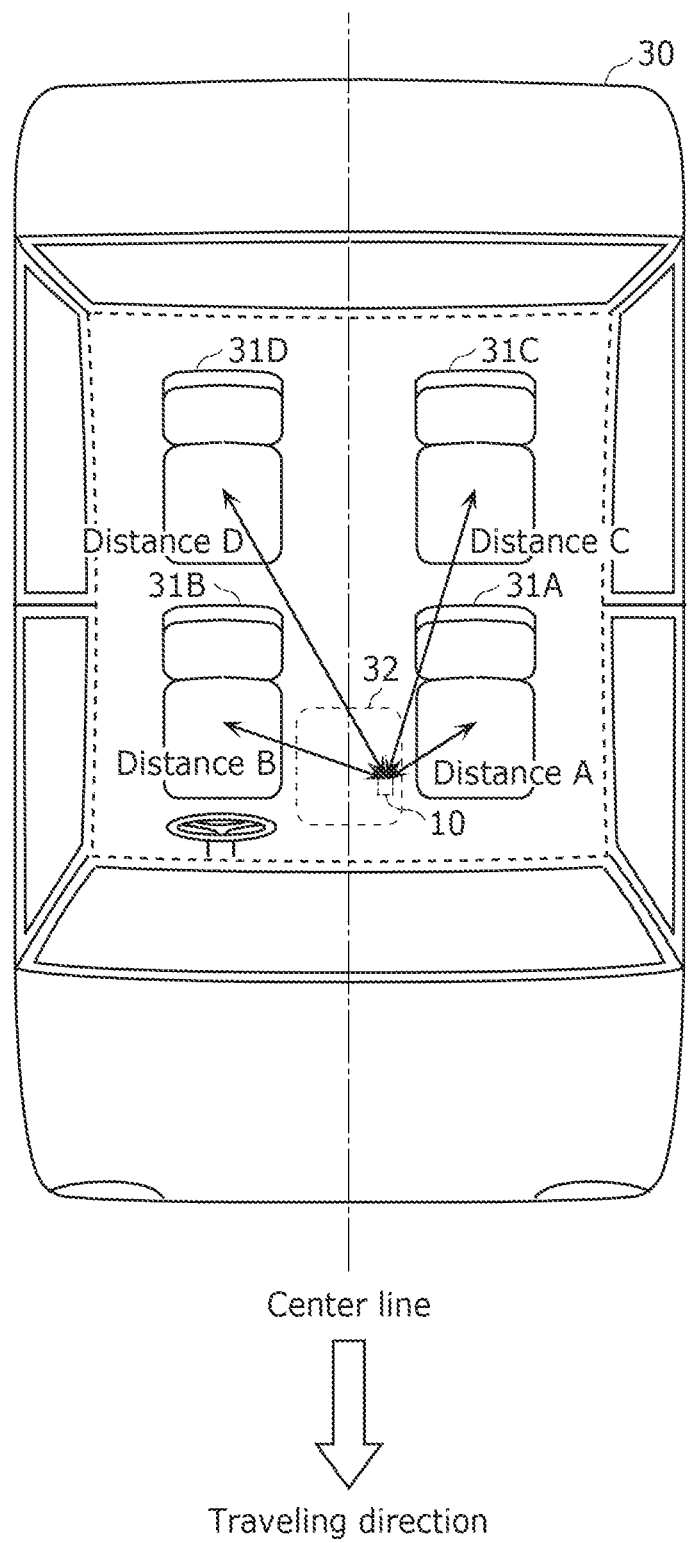
FIG. 2 is a plan view that schematically shows the occupied seat detection device according to Embodiment 1 disposed inside a vehicle.

FIG. 2 is a plan view that schematically shows occupied seat detection device 10 disposed inside vehicle 30. FIG. 2 illustrates some of the components inside vehicle 30 that cannot be visually recognized in actuality as if such components were visually recognizable.

As shown in FIG. 2, occupied seat detection device 10 is disposed inside overhead console 32 that is located on the ceiling of vehicle 30. More specifically, occupied seat detection device 10 is disposed in a position, inside overhead console 32, that is off the center line of vehicle 30 which extends in the traveling direction of vehicle 30.

Occupied seat detection device 10 disposed in the above position enables the following distances to be mutually different from one another: the distance travelled by an ultrasonic wave transmitted from transmitter 11 to reach receiver 12 after reflected by seat 31A; the distance travelled by an ultrasonic wave transmitted from transmitter 11 to reach receiver 12 after reflected by seat 31B; the distance travelled by an ultrasonic wave transmitted from transmitter 11 to reach receiver 12 after reflected by seat 31C; and the distance travelled by an ultrasonic wave transmitted from transmitter 11 to reach receiver 12 after reflected by seat 31D.

Returning to FIG. 1, the description of occupied seat detection device 10 is continued.

Transmission signal generator 19 generates a transmission signal that represents the waveform of a predetermined ultrasonic wave outputted from transmitter 11, and outputs the generated transmission signal to acoustic characteristics analyzer 13 and DAC 18. In the present description, transmission signal generator 19 generates a transmission signal that is a digital signal. Transmission signal generator 19 is implemented by, for example, a microprocessor (not illustrated) included in occupied seat detection device 10 executing a program recorded in a memory (not illustrated) included in occupied seat detection device 10.

Figure 3:
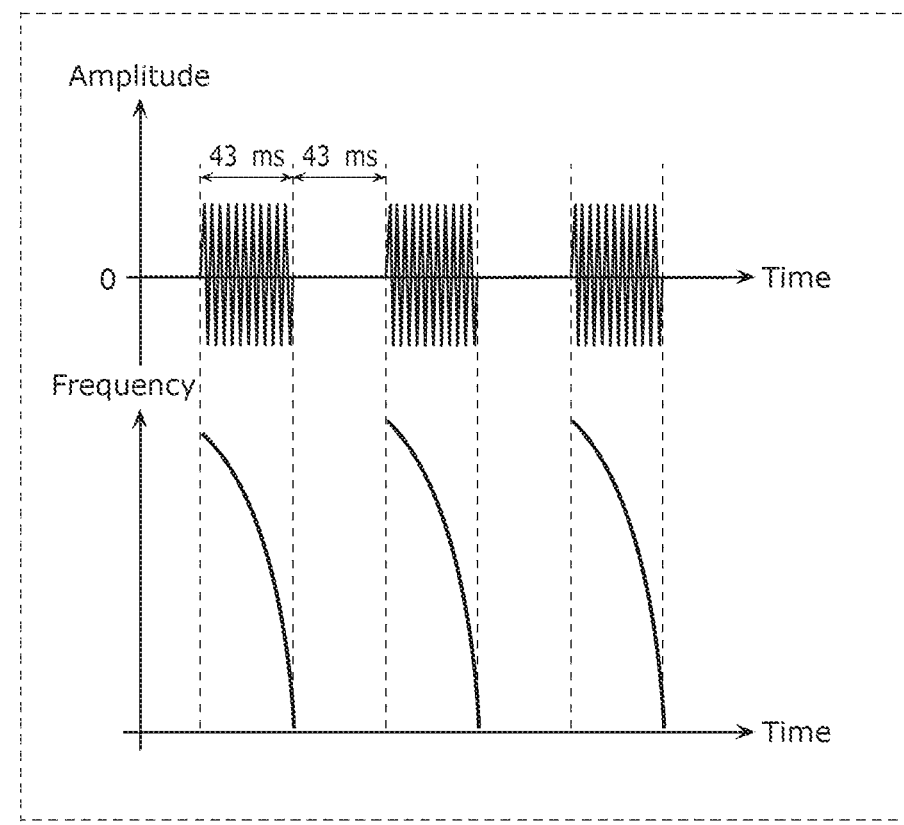
FIG. 3 is a waveform diagram showing exemplary transmission signals according to Embodiment 1.

FIG. 3 is a waveform diagram showing exemplary transmission signals outputted by transmission signal generator 19.

In FIG. 3, the horizontal axis indicates time, the vertical axis in the waveform shown in the upper side indicates the amplitude of a transmission signal, and the vertical axis in the waveform shown in the lower side indicates the frequency of the transmission signal.

As shown in FIG. 3, a transmission signal is an 86 ms signal including a signal presence period of 43 ms including a sweep sinusoidal signal and a signal absence period of 43 ms.

As shown in FIG. 3, transmission signal generator 19 successively outputs, one after another, transmission signals each including the signal presence period and the signal absence period.

Returning to FIG. 1, the description of occupied seat detection device 10 is continued.

DAC 18 converts the transmission signal, which is a digital signal generated by transmission signal generator 19, into an analog signal, and outputs the transmission signal, which is the resulting analog signal, to amplifier 16.

Amplifier 16 amplifies the transmission signal converted into the analog signal by DAC 18, and outputs the amplified transmission signal to transmitter 11. Through the above, transmitter 11 transmits a predetermined ultrasonic wave. As described above, transmission signal generator 19 successively outputs transmission signals one after another. As such, transmitter 11 successively transmits predetermined ultrasonic waves one after another.

Amplifier 15 amplifies the reception signal, which is the analog signal outputted from receiver 12, and outputs the amplified reception signal to ADC 17.

ADC 17 converts the reception signal, which is the amplified analog signal outputted from amplifier 16, into a digital signal, and outputs the reception signal, which is the resulting digital signal, to acoustic characteristics analyzer 13.

As described above, transmitter 11 successively transmits predetermined ultrasonic waves one after another. As such, receiver 12 successively receives the predetermined ultrasonic waves and their reflected waves one after another. Consequently, ADC 17 successively outputs reception signals, one after another, that correspond to the respective predetermined ultrasonic waves transmitted from transmitter 11.

Acoustic characteristics analyzer 13 calculates, from the signals received by receiver 12, the temporal characteristics or the frequency characteristics of the sound in the space inside vehicle 30, i.e., the space that includes a plurality of seats. More specifically, acoustic characteristics analyzer 13 receives the transmission signals that are outputted one after another from transmission signal generator 19 and the reception signals that are outputted one after another from ADC 17, and calculates one after another impulse responses of the inside of vehicle 30 on the basis of the predetermined ultrasonic waves, from the respective transmission signals that are inputted one after another and from the reception signals that correspond to the respective transmission signals. Acoustic characteristics analyzer 13 then outputs the calculated impulse responses one after another to detector 14.

Here, impulse responses of the inside of vehicle 30 calculated by acoustic characteristics analyzer 13 on the basis of the predetermined ultrasonic waves are an example of the temporal characteristics or the frequency characteristics of sound in the space inside vehicle 30. In the following description, the temporal characteristics or the frequency characteristics of sound inside vehicle 30 calculated by acoustic characteristics analyzer 13 are impulse responses of the inside of vehicle 30 that are calculated on the basis of the predetermined ultrasonic waves, but the temporal characteristics or the frequency characteristics of sound inside of vehicle 30 calculated by acoustic characteristics analyzer 13 are not necessarily limited to impulse responses of the inside of vehicle 30 that are calculated on the basis of the predetermined ultrasonic waves. Acoustic characteristics analyzer 13 is implemented by, for example, a microprocessor (not illustrated) included in occupied seat detection device 10 executing a program recorded in a memory (not illustrated) included in occupied seat detection device 10.

Figure 4:
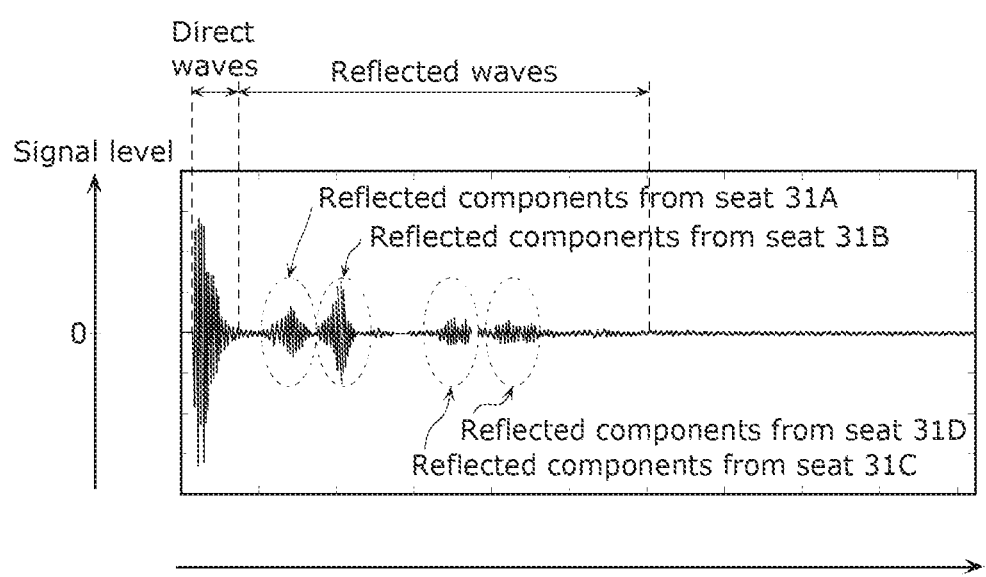
FIG. 4 is a waveform diagram showing an example of impulse responses generated by an acoustic characteristics analyzer according to Embodiment 1.

FIG. 4 is a waveform diagram showing an example of the impulse responses generated by acoustic characteristics analyzer 13.

In FIG. 4, the horizontal axis indicates time and the vertical axis indicates the signal level.

As shown in FIG. 4, the following positions in an impulse response are mutually different: the position on the temporal axis of the reflected components from seat 31A; the position on the temporal axis of the reflected components from seat 31B; the position on the temporal axis of the reflected components from seat 31C; and the position on the temporal axis of the reflected components from seat 31D. This is because the following distances are mutually different as described above: the distance travelled by an ultrasonic wave transmitted from transmitter 11 to reach receiver 12 after reflected by seat 31A; the distance travelled by an ultrasonic wave transmitted from transmitter 11 to reach receiver 12 after reflected by seat 31B; the distance travelled by an ultrasonic wave transmitted from transmitter 11 to reach receiver 12 after reflected by seat 31C; and the distance travelled by an ultrasonic wave transmitted from transmitter 11 to reach receiver 12 after reflected by seat 31D.

As described above, the positions on the temporal axis in an impulse response correspond to the length of the path from the transmitter to the position where a person's movement is generated, and to the receiver.

For example, acoustic characteristics analyzer 13 may also calculate an impulse response in the following manner: perform Fourier transform on a transmission signal and a reception signal; calculate, for each frequency, the ratio of the signal intensity between the transmission signal and the reception signal that have undergone Fourier transform; and perform inverse Fourier transform on the calculated ratio of the signal intensity for each frequency.

Detector 14 detects whether an occupant is present or whether an occupied seat is present in vehicle 30, on the basis of the temporal characteristics or the frequency characteristics, calculated by acoustic characteristics analyzer 13, of the sound in the space inside vehicle 30, and outputs the detection result. More specifically, detector 14: receives impulse responses that are calculated one after another by acoustic characteristics analyzer 13; detects whether an occupant is present or whether an occupied seat is present in vehicle 30, on the basis of a difference between an impulse response calculated on the basis of a predetermined ultrasonic wave transmitted by transmitter 11 at a first timing (such impulse response is hereinafter referred also as "first impulse response") and an impulse response calculated on the basis of a predetermined ultrasonic wave transmitted by the transmitter at a second timing (such impulse response is hereinafter referred also as "second impulse response"); and outputs the detection result. Detector 14 is implemented by, for example, a microprocessor (not illustrated) included in occupied seat detection device 10 executing a program recorded in a memory (not illustrated) included in occupied seat detection device 10.

Figure 5:
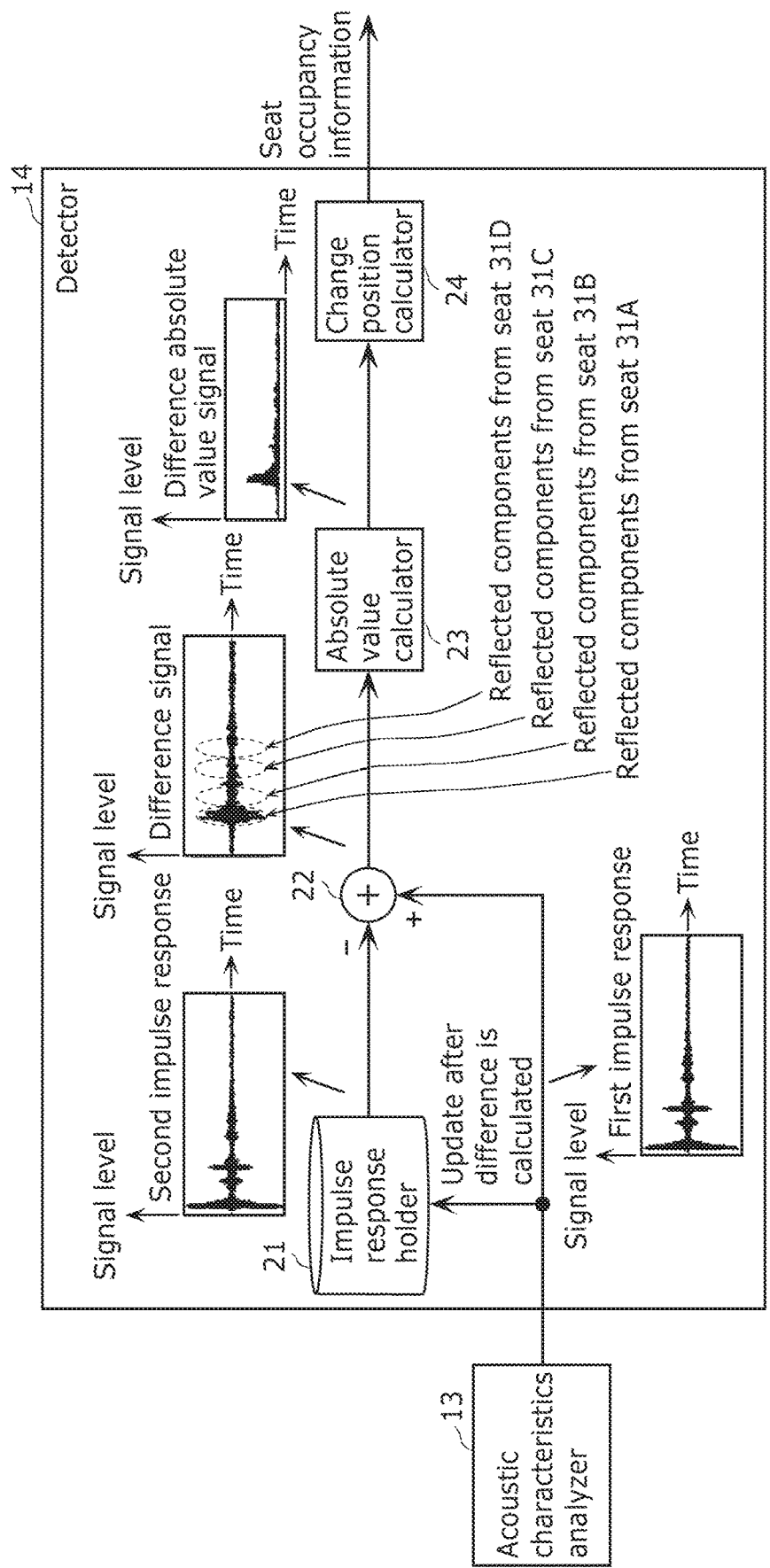
FIG. 5 is a block diagram showing the configuration of a detector according to Embodiment 1.

FIG. 5 is a block diagram showing the configuration of detector 14. In FIG. 5, schematic waveform diagrams of signals outputted from major structural elements of detector 14 are illustrated in an overlapped manner. In each of the waveform diagrams, the horizontal axis indicates time and the vertical axis indicates the signal level.

As shown in FIG. 5, detector 14 includes impulse response holder 21, difference calculator 22, absolute value calculator 23, and change position calculator 24.

Impulse response holder 21 stores impulse responses that are calculated one after another by acoustic characteristics analyzer 13.

When a new impulse response is inputted from acoustic characteristics analyzer 13, difference calculator 22 calculates a difference between the first impulse response, which is the newly inputted impulse response, and the second impulse response, which is one of the impulse responses stored in impulse response holder 21 (e.g., the impulse response inputted immediately before the first impulse response), and outputs a difference signal indicating the calculated difference to absolute value calculator 23.

As shown in FIG. 5, the following positions in the difference signal are mutually different: the position on the temporal axis of the reflected components from seat 31A; the position on the temporal axis of the reflected components from seat 31B; the position on the temporal axis of the reflected components from seat 31C; and the position on the temporal axis of the reflected components from seat 31D.

For this reason, when a person is seated in seat 31A, for example, a difference that is greater than or equal to a predetermined value is present in the position, on the temporal axis in the difference signal, of the reflected components from seat 31A due to a movement of such person (e.g., a movement caused by breathing, etc.). This is applicable to the cases where a person is seated in seat 31B, a person is seated in seat 31C, and a person is seated in seat 31D. As described above, when a person is seated in a seat inside vehicle 30, the position of such occupied seat is reflected in the position, on the temporal axis in the difference signal, where a difference that is greater than or equal to the predetermined value is present in the difference signal.

When the difference signal is inputted from difference calculator 22, absolute value calculator 23 calculates the absolute value of the inputted difference signal, and outputs, to change position calculator 24, a difference absolute value signal indicating the calculated absolute value of the difference signal.

When the absolute value difference signal is inputted from absolute value calculator 23, change position calculator 24 detects an occupied seat inside vehicle 30 on the basis of the difference absolute value signal, and outputs detection information indicating the detection result. More specifically, change position calculator 24 detects that an occupied seat is present in the case where the difference absolute value signal includes a difference that is greater than or equal to the predetermined value and outputs seat occupancy information indicating that an occupied seat is present. Meanwhile, change position calculator 24 detects that no occupied seat is present in the case where the difference absolute value signal includes no difference that is greater than or equal to the predetermined value and outputs seat occupancy information indicating that no occupied seat is present.

When the difference absolute value signal includes a difference that is greater than or equal to the predetermined value, change position calculator 24 further calculates the position of the occupied seat from the position, on the temporal axis in the difference absolute value signal, where the difference is present and incorporates information indicating the calculated position of the occupied seat into the seat occupancy information to be outputted.

Change position calculator 24 is not limited to calculating seat occupancy information using only a single difference absolute value signal, and thus may use the mean value, the maximum value, frequency changes, etc. of difference absolute value signals calculated in the past processes. Using these items of information as features, change position calculator 24 may also perform machine learning to make determinations.

When machine learning is utilized, determinations may be made in the manner described below.

In the learning phase, learning models are constructed and learned models are outputted. In the construction of the learning models, used as training data are many items of data of difference absolute value signals to which correct labels are assigned, each indicating whether an occupied seat is present. Examples of the items of data include difference absolute value signals obtained in the past, the mean value, the maximum value, frequency changes, etc. of difference absolute value signals obtained in the past processes. In the utilization phase, at least one of a difference absolute value signal obtained by the occupied seat detection device, the mean value, the maximum value, or the frequency changes of the difference absolute value signals obtained in the past processes is entered as input information to a generated learned model. The learned model is then internally processed, which is followed by the determination of whether an occupied seat is present. Note that a machine learning algorithm is not limited to a specific algorithm so long as the above output result is achieved. For example, an algorithm may be one that is typically used for supervised learning such as logistic regression and support-vector machine, or may be deep learning that utilizes a neural network capable of detecting features by itself.

Operation

Occupied seat detection device 10 with the foregoing configuration performs a first occupied seat detection process of detecting an occupied seat in vehicle 30.

With reference to the drawings, the following describes the first occupied seat detection process performed by occupied seat detection device 10.

Figure 6:
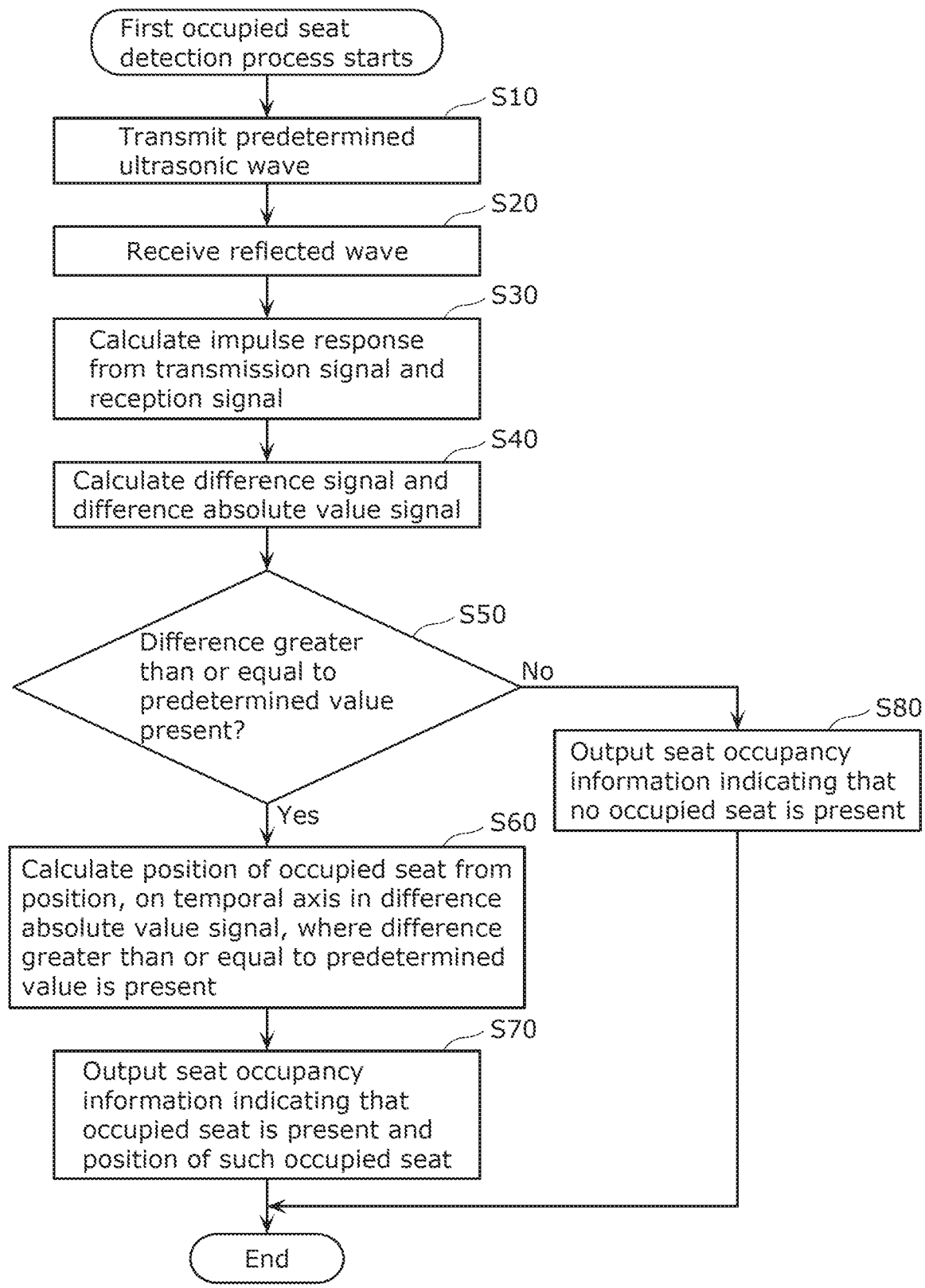
FIG. 6 is a flowchart of a first occupied seat detection process according to Embodiment 1.

FIG. 6 is a flowchart of the first occupied seat detection process.

The first occupied seat detection process starts, for example, in response to an output of a transmission signal from transmission signal generator 19 in a state that impulse responses calculated in the past by acoustic characteristics analyzer 13 are stored in impulse response holder 21.

When the first occupied seat detection process starts, transmitter 11 transmits a predetermined ultrasonic wave to inside vehicle 30 (step S10).

After transmitter 11 transmits the predetermined ultrasonic wave, receiver 12 receives such ultrasonic wave and the reflected wave of such ultrasonic wave, and outputs a reception signal (step S20).

After receiver 12 outputs the reception signal, acoustic characteristics analyzer 13 calculates an impulse response of the inside of vehicle 30 on the basis of the predetermined ultrasonic wave, on the basis of the transmission signal outputted from transmission signal generator 19 and the reception signal outputted from receiver 12 (step S30), and outputs the calculated impulse response.

After acoustic characteristics analyzer 13 outputs the impulse response, difference calculator 22 calculates a difference between a first impulse response, which is the foregoing impulse response, and a second impulse response, which is an impulse response calculated by acoustic characteristics analyzer 13 in the past and stored in impulse response holder 21, and outputs a difference signal indicating the calculated difference. Subsequently, absolute value calculator 23 calculates the absolute value of the difference signal outputted from difference calculator 22, and outputs a difference absolute value signal indicating the calculated absolute value of the difference signal (step S40).

After absolute value calculator 23 outputs the difference absolute value signal, change position calculator 24 checks whether the difference absolute value signal includes a difference that is greater than or equal to the predetermined value (step S50).

In the process of step S50, when a difference that is greater than or equal to the predetermined value is present (step S50: Yes), change position calculator 24 further calculates the position of an occupied seat on the basis of the position, on the temporal axis in the absolute value difference signal, where such difference is present (step S60). Subsequently, change position calculator 24 outputs seat occupancy information indicating that an occupied seat is present and the position of the occupied seat (step S70).

In the process of step S50, when no difference that is greater than or equal to the predetermined value is present (step S50: No), change position calculator 24 outputs a seat occupancy signal indicating that no occupied seat is present (step S80).

When the process of step S70 is finished and the process of step S80 is finished, occupied seat detection device 10 ends the first occupied seat detection process.

Consideration

According to occupied seat detection device 10 with the foregoing configuration, it is not necessary to embed sensors, etc. (here, transmitter 11 and receiver 12) in each of the seats (here, seat 31A through seat 31D) to be detected. Also, a single set of sensors, etc. (here, transmitter 11 and receiver 12) is capable of detecting whether an occupant is present or whether an occupied seat is present in at least two seats (here, seat 31A through seat 31D). Further, it is not necessary to perform image processing using a camera, thus achieving reduction in memory load and in the amount of computation, compared to conventional devices that detect an occupied seat by performing image processing using a camera.

Occupied seat detection device 10 calculates impulse responses of the inside of vehicle 30 on the basis of ultrasonic waves. In general, noise inside of a vehicle is less generated by ultrasonic waves than by sound waves. For this reason, occupied seat detection device 10 is capable of more accurately detecting whether an occupant is present or whether an occupied seat is present than an occupied seat detection device that is configured to calculate impulse responses of the inside of a vehicle on the basis of sound waves.

As described above, occupied seat detection device 10 detects whether an occupant is present or whether an occupied seat is present on the basis of whether a person's movement is present. This enables the detection of whether an occupant or an occupied seat is present regardless of a person's shape or posture. It is further possible to prevent an object without any movements, such as a baggage placed on a seat, for example, from mistakenly detected as an occupant or an occupied seat.

As described above, occupied seat detection device 10 does not require sensors, etc. to be embedded in each seat to be detected. As such, it is possible to detect whether an occupant is present or whether an occupied seat is present regardless of changes in the shape of seats (e.g., a change in the shape of a seat from the chair shape to the mattress shape), a storage state of part of a seat, etc.

In general, ultrasonic waves are capable of reaching behind an object by diffraction. For this reason, it is possible for occupied seat detection device 10 to detect whether an occupant is present or whether an occupied seat is present also in a region that cannot be visually recognized directly from the position where occupied seat detection device 10 is located.

Occupied seat detection device 10 is capable of outputting the calculated seat occupancy signal to, for example, an electronic control unit (ECU) that controls vehicle 30. This enables the ECU that controls vehicle 30 to, for example, prevent an unrequired expansion of the air-bag in an unoccupied seat. Also, the ECU that controls vehicle 30 is capable, for example, of turning off the seat heater of an unoccupied seat to reduce battery consumption. The ECU that controls vehicle 30 is also capable, for example, of preventing wind from an air-conditioner from unwantedly blowing toward an unoccupied seat.

Embodiment 2

The following describes an occupied seat detection device according to Embodiment 2 that differs from occupied seat detection device 10 according to Embodiment 1 in some of the structural elements. The present occupied seat detection device is included in a vehicle for an in-vehicle emergency call system, i.e., a vehicle equipped with a speaker, a microphone, and a communication device used in an in-vehicle emergency call system (such vehicle will be also referred to as "vehicle according to Embodiment 2"). In the following description of the occupied seat detection device according to Embodiment 2, differences from occupied seat detection device 10 are mainly described. Note that examples of the in-vehicle emergency call system include e-Call.

Figure 7:
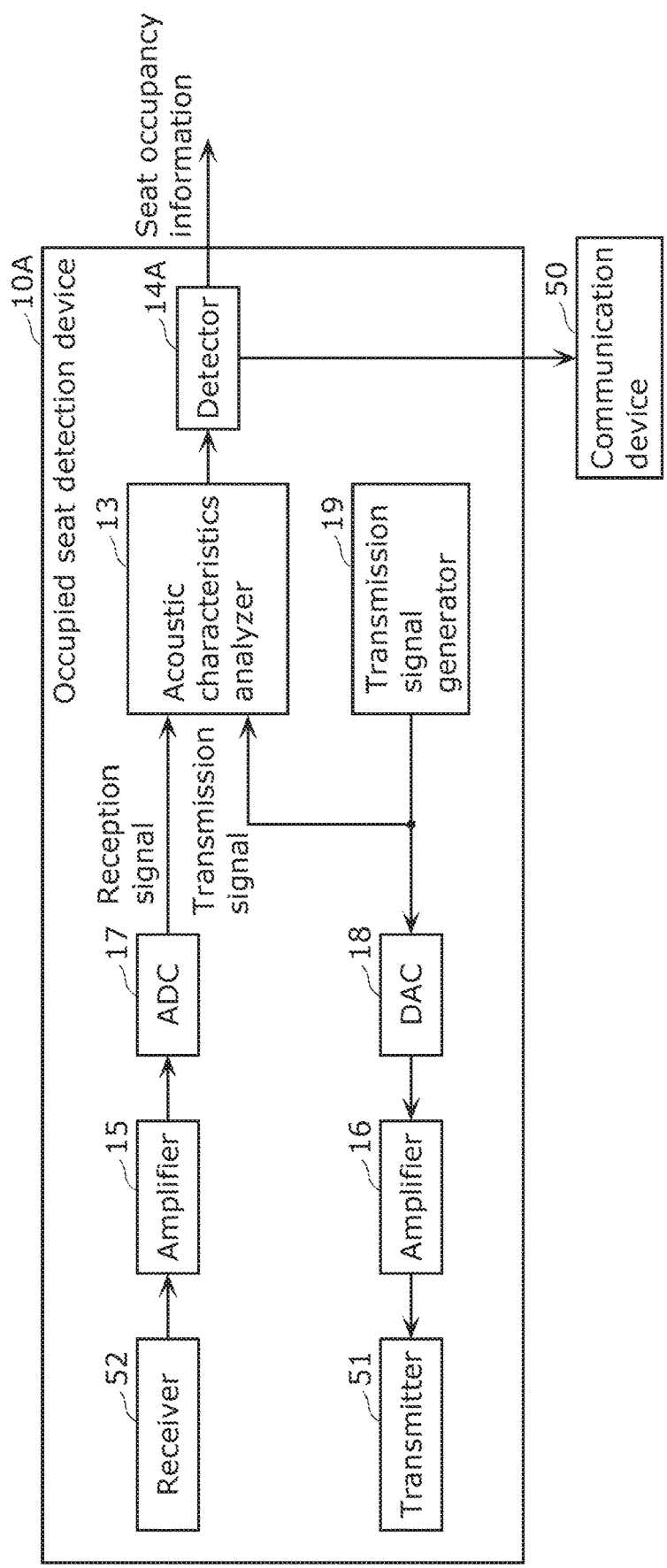
FIG. 7 is a block diagram showing the configuration of an occupied seat detection device according to Embodiment 2.

FIG. 7 is a block diagram showing the configuration of occupied seat detection device 10A according to Embodiment 2.

As shown in FIG. 7, occupied seat detection device 10A differs from occupied seat detection device 10 according to Embodiment 1 in that transmitter 11 is replaced by transmitter 51, receiver 12 is replaced by receiver 52, and detector 14 is replaced by detector 14A.

Transmitter 51, which is a speaker used in the emergency call system, has the same functions as those of transmitter 11. Stated differently, transmitter 51 serves both as a transmitter of occupied seat detection device 10A and a speaker for the emergency call system.

Receiver 52, which is a microphone used in the emergency call system, has the same functions as those of receiver 12. Stated differently, receiver 52 serves both as a receiver of occupied seat detection device 10A and a microphone for the emergency call system.

In addition to the functions of detector 14, detector 14A has an additional function described below.

That is to say, the additional function is a function of transmitting, to an emergency call center, information relating to whether an occupant is present or whether an occupied seat is present detected inside the vehicle according to Embodiment 2, using communication device 50 used in the in-vehicle emergency call system, when a predetermined condition is satisfied. Here, the predetermined condition may be, for example, that the emergency call system determines that the vehicle according to Embodiment 2 has caused an accident and that the emergency call system determines that a person on the vehicle according to Embodiment 2 is suffering a sudden illness.

Consideration

According to occupied seat detection device 10A with the foregoing configuration, occupied seat detection device 10A and the emergency call system make shared use of the speaker and the microphone. This configuration reduces the number of speakers and the number of microphones equipped in the vehicle according to Embodiment 2.

Also, occupied seat detection device 10A with the foregoing configuration is capable of transmitting, to an emergency call center, information relating to whether an occupant is present or whether an occupied seat is present in the event of an emergency such as when the vehicle according to Embodiment 2 has caused an accident and a person on the vehicle according to Embodiment 2 is suffering from a sudden illness. This enables emergency staff dispatched to the vehicle according to Embodiment 2 upon request from the emergency call center to previously grasp, for example, the position of the seat occupied by the person and the number of persons on the vehicle. This enables more prompt and/or more reliable emergency aid activities.

Embodiment 3

The following describes an occupied seat detection device according to Embodiment 3 that differs from occupied seat detection device 10 according to Embodiment 1 in some of the structural elements. In the following description of the occupied seat detection device according to Embodiment 3, differences from occupied seat detection device 10 are mainly described.

Figure 8:
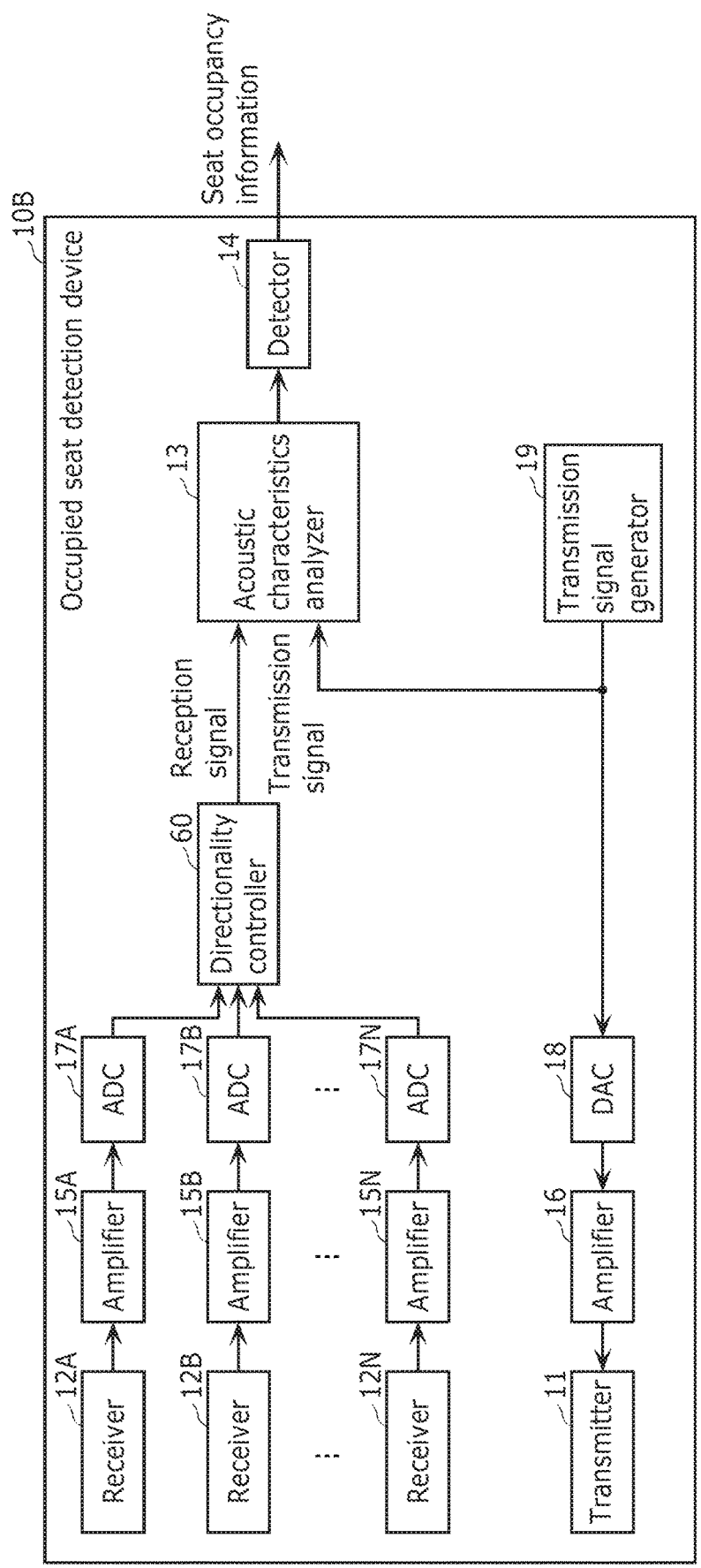
FIG. 8 is a block diagram showing the configuration of an occupied seat detection device according to Embodiment 3.

FIG. 8 is a block diagram showing the configuration of occupied seat detection device 10B according to Embodiment 3.

As shown in FIG. 8, occupied seat detection device 10B differs from occupied seat detection device 10 according to Embodiment 1 in that receiver 12 is replaced by receiver 12A through receiver 12N, amplifier 15 is replaced by amplifier 15A through amplifier 15N, ADC 17 is replaced by ADC 17A through ADC 17N, and directionality controller 60 is newly added.

Receiver 12A through receiver 12N each have the same functions as those of receiver 12.

Amplifier 15A through amplifier 15N each have the same functions as those of amplifier 15.

ADC 17A through ADC 17N each have the same functions as those of ADC 17.

Stated differently, the configuration of occupied seat detection device 10B differs from that of occupied seat detection device 10 in that the number of receivers 12 changes from one to K, the number of amplifiers 15 changes from one to K, and the number of ADCs 17 changes from one to K. In FIG. 8, K is illustrated as if K were an integer greater than or equal to 3, but K is not limited to an integer greater than or equal to 3 as shown in FIG. 8 so long as K is an integer greater than or equal to 2.

Directionality controller 60 receives K reception signals outputted from ADC 17A through ADC 17N, and performs directionality control using at least two of the K reception signals inputted. Through this, directionality controller 60 calculates reception signals in which reflected wave components from a specific direction are emphasized, and outputs, to transmission signal generator 19, the calculated reception signals in which the reflected wave components from the specific direction are emphasized. Directionality controller 60 is implemented by, for example, a microprocessor (not illustrated) included in occupied seat detection device 10B executing a program recorded in a memory (not illustrated) included in occupied seat detection device 10B.

Consideration

According to occupied seat detection device 10B with the foregoing configuration, it is possible to more accurately calculate the position of an occupied seat than occupation detection device 10 according to Embodiment 1.

Embodiment 4

The following describes an occupied seat detection device according to Embodiment 4 that differs from occupied seat detection device 10 according to Embodiment 1 in some of the structural elements.

In the following description of the occupied seat detection device according to Embodiment 4, differences from occupied seat detection device 10 are mainly described.

Figure 9:
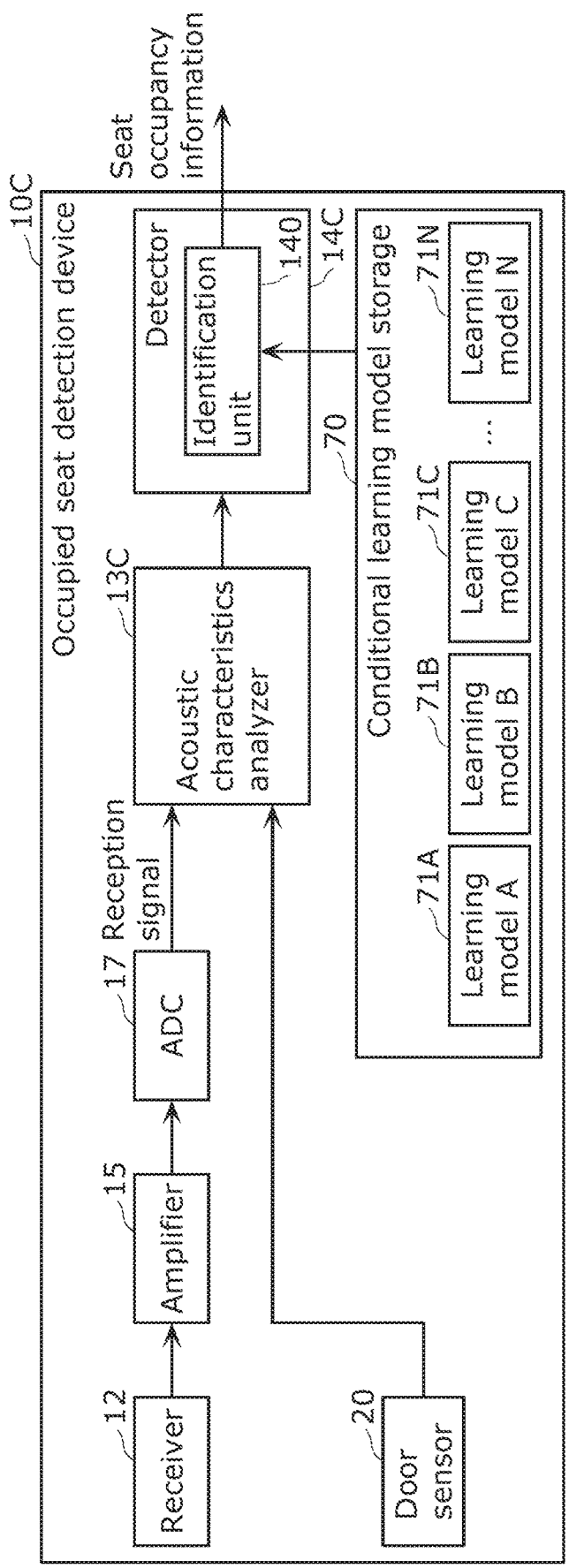
FIG. 9 is a block diagram showing the configuration of an occupied seat detection device according to Embodiment 4.

FIG. 9 is a block diagram showing the configuration of occupied seat detection device 10C according to Embodiment 4.

As shown in FIG. 9, occupied seat detection device 10C differs from occupied seat detection device 10 according to Embodiment 1 in that: transmitter 11, amplifier 16, DAC 18, and transmission signal generator 19 are eliminated; door sensor 20 and conditional learning model storage 70 are newly added; and acoustic characteristics analyzer 13 is replaced by acoustic characteristics analyzer 13C and detector 14 is replaced by detector 14C.

Figure 10:
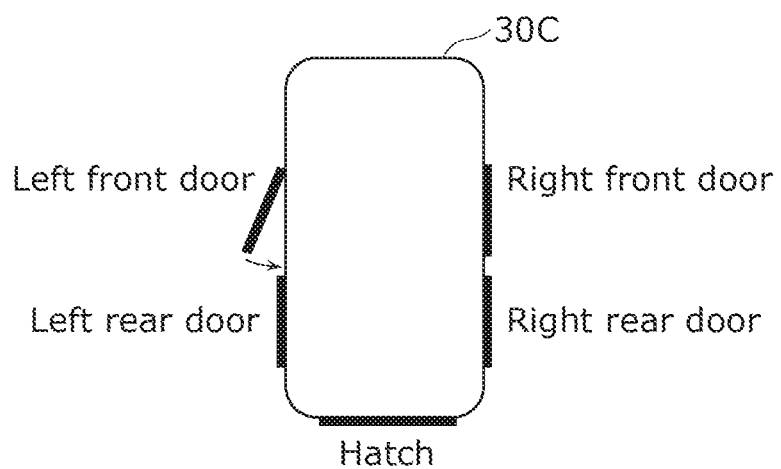
FIG. 10 is a plan view that schematically shows a vehicle on which the occupied seat detection device according to Embodiment 4 is disposed.

FIG. 10 is a plan view that schematically shows vehicle 30C on which occupied seat detection device 10C is disposed. In Embodiment 4, as shown in FIG. 10, occupied seat detection device 10C is disposed on vehicle 30C that includes the left front door, the right front door, the left rear door, the right rear door, and the hatch. The following description assumes to utilize the sound that is generated when the left front door, the right front door, the left rear door, the right rear door, or the hatch (hereinafter also referred to simply as "door") is closed to detect whether an occupant is present or whether an occupied seat is present. Note, however, that the occupied seat detection device according to Embodiment 4 is not necessarily limited to being included in a structure that is the same as vehicle 30C so long as the occupied seat detection device is included in a structure that has the function of generating sound inside a space that includes a plurality of seats. The occupied seat detection device according to Embodiment 4 is also not limited to utilizing the sound that is generated when a door is closed to detect whether an occupant is present or whether an occupied seat is present.

Also note that the following description assumes that occupied seat detection device 10C is disposed on vehicle 30C, but not all of the structural elements of occupied seat detection device 10 are required to be disposed on vehicle 30C so long as at least receiver 12 is disposed on vehicle 30C.

Door sensor 20 detects an open/close state of each of the left front door, the right front door, the left rear door, the right rear door, and the hatch.

Acoustic characteristics analyzer 13C calculates, from the reception signals received by receiver 12, the temporal characteristics or the frequency characteristics of the sound in the space inside vehicle 30C, i.e., the space that includes a plurality of seats. More specifically, acoustic characteristics analyzer 13C receives the detection result of a door open/close state outputted from door sensor 20 and reception signals outputted from ADC 17, detects a door closing event from the detection result of the door open/close state, and obtains the reception signals of before and after the door closing event. Acoustic characteristics analyzer 13C then calculates the temporal characteristics or the frequency characteristics of the sound in the space inside vehicle 30C from the obtained reception signals.

Here, the door closing event refers to changes in the state of at least one of the left front door, the right front door, the left rear door, the right rear door, or the hatch from the open state to the closed state. Such door closing event occurs when, for example, an occupant of vehicle 30C gets on or off the vehicle.

Conditional learning model storage 70 stores a plurality of machine learning models (hereinafter also referred to simply as "learning model") that have been trained under mutually different conditions.

Each of the learning models is preliminarily trained using, as training data, the temporal characteristics or the frequency characteristics of the sound inside vehicle 30C that are outputted from acoustic characteristics analyzer 13C and each assigned with a correct label.

Here, the mutually different conditions include at least: a condition that a door closing event occurs in the left front door with all the other doors closed; a condition that a door closing event occurs in the right front door with all the other doors closed; a condition that a door closing event occurs in the left front door with all the other doors closed; and a condition that a door closing event occurs in the hatch with all the other doors closed.

Also, a plurality of learning models stored in conditional learning model storage 70 include at least: learning model A 71A that has been trained using training data that satisfies the condition that a door closing event occurs in the left front door with all the other doors closed; learning model B 71B that has been trained using training data that satisfies the condition that a door closing event occurs in the right front door with all the other doors closed; learning model C 71C that has been trained using training data that satisfies the condition that a door closing event occurs in the left rear door with all the other doors closed; and learning model N 71N that has been trained using training data that satisfies the condition that a door closing event occurs in the hatch with all the other doors closed.

FIG. 11 is a schematic diagram showing an exemplary correspondence between training data used for training, the condition satisfied by such training data, and the correct label assigned to the training data, regarding each of a plurality of learning models stored in conditional learning model storage 70.

Detector 14C detects whether an occupant is present or whether an occupied seat is present in vehicle 30C on the basis of the temporal characteristics or the frequency characteristics of the sound in the space inside vehicle 30C calculated by acoustic characteristics analyzer 13C, and outputs the detection result. More specifically, detector 14C includes identification unit 140, to which detector 14C inputs the temporal characteristics or the frequency characteristics of the sound in the space inside vehicle 30C calculated by acoustic characteristics analyzer 13C and the door closing event detected by acoustic characteristics analyzer 13C. Detector 14C then obtains information relating to whether an occupant is present or whether an occupied seat is present in vehicle 30C, outputted from identification unit 140, and outputs the obtained information relating to whether an occupant is present or whether an occupied seat is present in vehicle 30C.

When receiving the temporal characteristics or the frequency characteristics of the sound in the space inside vehicle 30C calculated by acoustic characteristics analyzer 13C and the door closing event detected by acoustic characteristics analyzer 13C, identification unit 140 obtains, from conditional learning model storage 70, the learning model that has been trained using the training data that satisfies the condition corresponding to such inputted door closing event. Identification unit 140 then enters, to the obtained learning model, the inputted temporal characteristics or frequency characteristics of the sound in the space inside vehicle 30C, obtains information relating to whether an occupant is present or whether an occupied seat is present in vehicle 30C outputted from such learning model, and outputs the obtained information relating to whether an occupant is present or whether an occupied seat is present in vehicle 30C.

Operation

Occupied seat detection device 10C with the foregoing configuration performs a second occupied seat detection process of detecting an occupied seat in vehicle 30C.

With reference to the drawings, the following describes the second occupied seat detection process performed by occupied seat detection device 10C.

Figure 12:
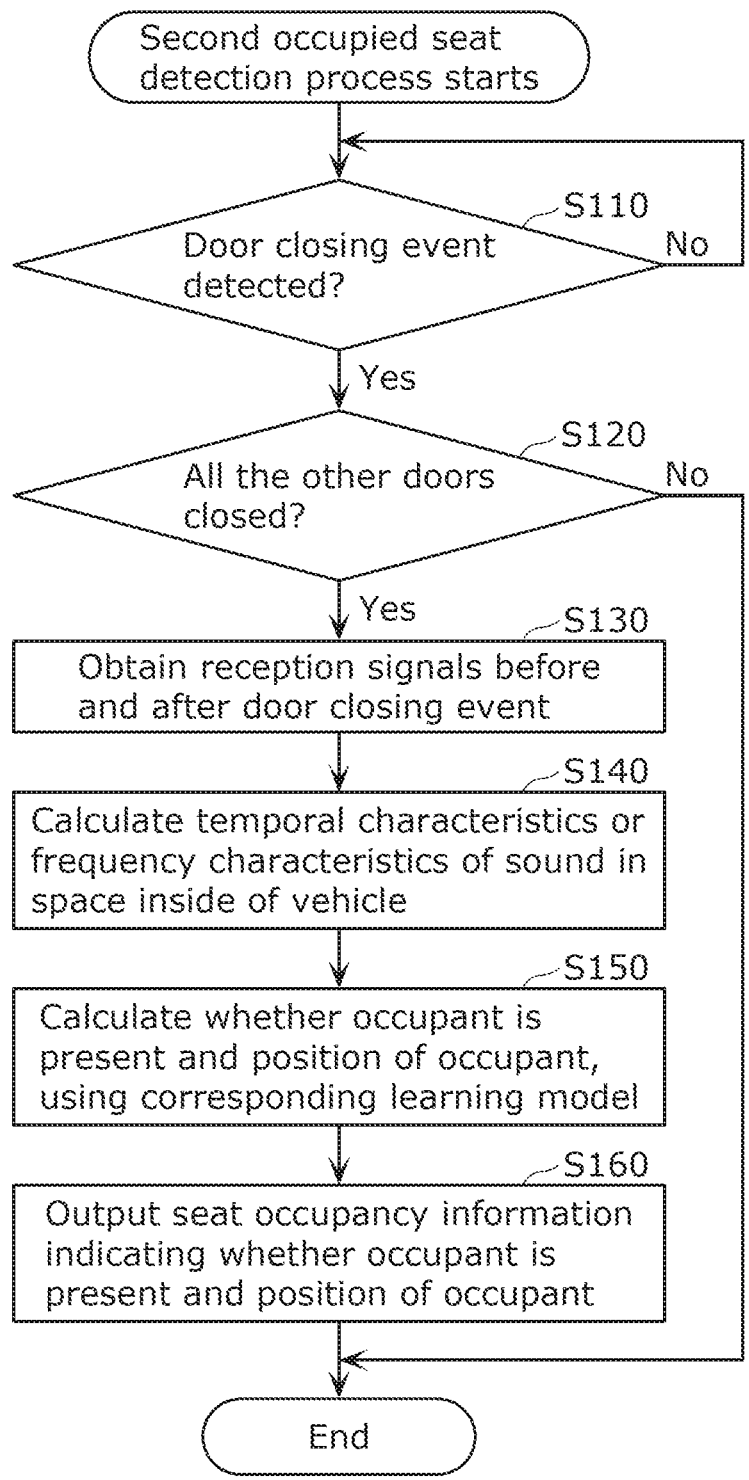
FIG. 12 is a flowchart of a second occupied seat detection process according to Embodiment 4.

FIG. 12 is a flowchart of the second occupied seat detection process.

When the second occupied seat detection process starts, acoustic characteristics analyzer 13C starts trying to detect a door closing event (step S110).

In the process of step S110, when detecting a door closing event (step S110: after repeating No, step S110: Yes), acoustic characteristics analyzer 13C checks whether all the doors are closed other than the door in which the door closing event is detected (step S120).

In the process of step S120, when all the doors are closed other than the door in which the door closing event is detected (step S120: Yes), acoustic characteristics analyzer 13C obtains the reception signals of before and after the detected door closing event (step S130).

When obtaining the reception signals of before and after the detected door closing event, acoustic characteristics analyzer 13C calculates the temporal characteristics or the frequency characteristics of the sound in the space inside vehicle 30C from the obtained reception signals (step S140).

After the temporal characteristics or the frequency characteristics of the sound in the space inside vehicle 30C are calculated, detector 14C obtains information relating to whether an occupant is present or whether an occupied seat is present in vehicle 30C, using the learning model that has been trained using the training data that satisfies the condition corresponding to the door closing event detected by acoustic characteristics analyzer 13C (step S150).

In the process of step S120, when at least one of the doors is not closed other than the door in which the door closing event is detected (step S120: No), and when the process of step S150 is finished, occupied seat detection device 10C ends the second occupied seat detection process.

Consideration

According to occupied seat detection device 10C with the foregoing configuration, it is possible to detect whether an occupant is present or whether an occupied seat is present, utilizing the sound that is generated when a door is closed.

Supplemental Remarks

The occupied seat detection device according to an aspect of the present disclosure has been described above on the basis of Embodiment 1 through Embodiment 3, but the present disclosure is not limited to these embodiments. The scope of one or more aspects of the present disclosure may also include: an embodiment achieved by making various modifications to the embodiments that can be conceived by those skilled in the art without departing from the essence of the present disclosure; and an embodiment achieved by combining some of the structural elements in different embodiments.

(1) In the description of Embodiment 1, occupied seat detection device 10 is disposed in a position, inside overhead console 32, that is off the center line of vehicle 30 which extends in the traveling direction of vehicle 30. However, occupied seat detection device 10 is not necessarily limited to being disposed in such exemplary position, inside overhead console 32, that is off the center line of vehicle 30 which extends in the traveling direction of vehicle 30, so long as occupied seat detection device 10 is disposed in a position that enables an ultrasound wave transmitted from transmitter 11 to reach receiver 12 after being reflected by at least one of seat 31A through seat 31D.

Occupied seat detection device 10 is not necessarily disposed in a limited position, but the following distances may be mutually different from one another: the distance travelled by an ultrasonic wave transmitted from transmitter 11 to reach receiver 12 after reflected by seat 31A (such distance is hereinafter also referred to as "first distance"); the distance travelled by an ultrasonic wave transmitted from transmitter 11 to reach receiver 12 after reflected by seat 31B (such distance is hereinafter also referred to as "second distance"); the distance travelled by an ultrasonic wave transmitted from transmitter 11 to reach receiver 12 after reflected by seat 31C (such distance is hereinafter also referred to as "third distance"); and the distance travelled by an ultrasonic wave transmitted from transmitter 11 to reach receiver 12 after reflected by seat 31D (such distance is hereinafter also referred to as "fourth distance"). In general, seats inside a vehicle are located in axially symmetrical positions when the center line of the vehicle, which extends in the traveling direction of the vehicle, serves as the central axis. For this reason, to enable the first distance, the second distance, the third distance, and the fourth distance to be mutually different in vehicle 30, at least one of transmitter 11 or receiver 12, for example, is disposed in a position that is off the center line of vehicle 30 which extends in the traveling direction of vehicle 30, and when the center line serves as a symmetric axis, transmitter 11 is not disposed in an axially symmetrical position with receiver 12.

(2) In the description of Embodiment 1, difference calculator 22 calculates, as an example, a difference between the first impulse response, which is a newly inputted impulse response, and the second impulse response, which is the impulse response inputted immediately before the first impulse response. However, the first impulse response and the second impulse response are not necessarily limited to an exemplary impulse response that is newly inputted and an exemplary impulse response that is inputted immediately before the first impulse response, respectively, so long as impulse responses are in response to ultrasonic waves transmitted from transmitter 11 at different timings. For example, the first impulse response may be an impulse response that is newly inputted and the second impulse response may be an impulse response that is previously calculated by acoustic characteristics analyzer 13 as an impulse response of vehicle 30 without any passengers.

(3) In the description of Embodiment 1, transmission signal generator 19 generates a transmission signal that is a sweep sinusoidal signal. However, the transmission signal is not limited to a sweep sinusoidal signal. The transmission signal thus may be, for example, a white noise signal, a band noise signal, and a sine wave.

Also, the signal presence period and the signal absence period are not limited to 43 ms, and thus may have different lengths of time.

(4) In the description of Embodiment 1, detector 14 includes absolute value calculator 23. However, detector 14 can have another configuration that includes no absolute value calculator 23. When detector 14 has such configuration, difference calculator 22 outputs a calculated difference signal to change position calculator 24. When the difference signal is inputted from difference calculator 22, change position calculator 24 detects an occupied seat inside vehicle 30 on the basis of the difference signal, and outputs detection information indicating the detection result. More specifically, change position calculator 24 detects that an occupied seat is present when the difference signal includes a difference that is greater than or equal to the predetermined value and outputs seat occupancy information indicating that an occupied seat is present. Meanwhile, change position calculator 24 detects that no occupied seat is present when the difference signal includes no difference that is greater than or equal to the predetermined value and outputs seat occupancy information indicating that no occupied seat is present. When the difference signal includes a difference that is greater than or equal to the predetermined value, change position calculator 24 further calculates the position of the occupied seat from the position, on the temporal axis in the difference signal, where such difference is present, and incorporates information indicating the calculated position of the occupied seat into the seat occupancy information to be outputted.

(5) In Embodiment 1, receiver 12 may be, for example, a digital micro electro mechanical system (MEMS) microphone. In this case, receiver 12 outputs a digital signal, and thus amplifier 15 and ADC 17 are not necessary.

(6) In the description of Embodiment 1, a vehicle which is an automobile is an exemplary space that includes a plurality of seats, but the space that includes a plurality of seats is not limited to an example of the vehicle which is an automobile, and thus may be a mobile object other than a vehicle which is an automobile. Occupied seat detection device 10 is applicable, for example, to the detection of an occupied seat in a mobile object other than the vehicle which is an automobile, such as a vehicle that carry many passengers, a bus, a train, an aircraft, etc. In the present time, a crew person, etc. walks through inside of a vehicle that carry many passengers, a bus, a train, or an aircraft to check, for example, seat occupancy. The use of occupied seat detection device 10, however, reduces the number of times a crew person, etc. needs to walk through inside of the vehicle, for example, thus reducing the risk of acquiring an infection such as coronavirus, etc.

Also, the space that includes a plurality of seats is not limited to a mobile object, and thus may be another place such as, for example, an indoor space that include seats, such as a movie theater.

(7) In the description of Embodiment 4, occupied seat detection device 10C detects whether an occupant is present or whether an occupied seat is present, using the sound that is generated when a door of vehicle 30C is closed. However, the sound utilized by occupied seat detection device 10C to detect whether an occupant is present or whether an occupied seat is present is not necessarily limited to the sound that is generated when a door of vehicle 30C is closed so long as the sound is generated inside or outside vehicle 30C. The sound utilized by occupied seat detection device 10C to detect whether an occupant is present or whether an occupied seat is present may be, for example, the sound that is generated when a door mirror is housed or may be an external noise of vehicle 30C. Also, the type of sound utilized by occupied seat detection device 10C to detect whether an occupant is present or whether an occupied seat is present is not limited to a specific type, and thus may be, for example, audible sound and an ultrasonic wave.

(8) An aspect of the present disclosure may be not only the occupied seat detection device according to Embodiment 1 through Embodiment 4, but also an occupied seat detection method that includes, as its steps, the characteristic elements included in the occupied seat detection device. Another aspect of the present disclosure may be a program that causes a device including a computer to execute the characteristic steps included in the occupied seat detection method. Further another aspect of the present disclosure may be a non-transitory, computer-readable recording medium on which such program is recorded.

INDUSTRIAL APPLICABILITY

The present disclosure is widely applicable for use as an occupied seat detection device, etc. that detect whether an occupant is present or whether an occupied seat is present in a space that includes a plurality of seats.

The invention claimed is:

1. An occupied seat detection device comprising:
at least one receiver that is disposed in a space including a plurality of seats and receives at least one of sound generated inside the space or sound generated outside the space;
an acoustic characteristics analyzer that calculates, from a signal received by the at least one receiver, temporal characteristics or frequency characteristics of the sound in the space;
a detector that detects whether an occupant is present or whether an occupied seat is present inside the space, based on the temporal characteristics or the frequency characteristics calculated by the acoustic characteristics analyzer, and outputs a detection result; and
a transmitter that transmits a predetermined sound to inside the space,
wherein the at least one receiver receives a reflected wave of the predetermined sound,
the acoustic characteristics analyzer calculates, from a signal of the predetermined sound and the signal received by the at least one receiver, the temporal characteristics or the frequency characteristics based on the predetermined sound,
the detector detects whether an occupant is present or whether an occupied seat is present, based on a difference between (i) the temporal characteristics or the frequency characteristics calculated by the acoustic characteristics analyzer based on the predetermined sound transmitted by the transmitter at a first timing and (ii) the temporal characteristics or the frequency characteristics calculated by the acoustic characteristics analyzer based on the predetermined sound transmitted by the transmitter at a second timing, and
when the detector detects that an occupant is present or an occupied seat is present, the detector calculates a position of the occupant detected or a position of the occupied seat detected.

2. The occupied seat detection device according to claim 1,
wherein the predetermined sound transmitted by the transmitter is an ultrasonic wave.

3. The occupied seat detection device according to claim 1,
wherein the transmitter is disposed in a position from which the transmitter is able to transmit sound to all of the plurality of seats inside the space.

4. The occupied seat detection device according to claim 1,
wherein the space is an internal space of a vehicle,
at least one of the transmitter or the at least one receiver is disposed in a position that is off a center line of the vehicle which extends in a traveling direction of the vehicle, and
when the center line serves as a symmetric axis, the transmitter is not disposed in an axially symmetrical position with the at least one receiver.

5. The occupied seat detection device according to claim 4,
wherein the transmitter and the at least one receiver are disposed inside an overhead console of the vehicle.

6. The occupied seat detection device according to claim 1,
wherein the at least one receiver comprises a plurality of receivers, and
the acoustic characteristics analyzer calculates the temporal characteristics or the frequency characteristics by performing directionality control that uses at least two of a plurality of reception signals received by the plurality of receivers, each of the plurality of reception signals representing a waveform of the reflected wave.

7. The occupied seat detection device according to claim 1,
wherein when a difference that is greater than or equal to a predetermined value is present between the temporal characteristics or the frequency characteristics calculated by the acoustic characteristics analyzer based on the predetermined sound transmitted by the transmitter at the first timing and the temporal characteristics or the frequency characteristics calculated by the acoustic characteristics analyzer based on the predetermined sound transmitted by the transmitter at the second timing, the detector further calculates the position of the occupied seat from a position, on a temporal axis in the temporal characteristics or the frequency characteristics, where the difference is present.

8. The occupied seat detection device according to claim 1,
wherein the transmitter and at least one of the at least one receiver are a speaker and a microphone, respectively, used in an in-vehicle emergency call system.

9. The occupied seat detection device according to claim 1,
wherein the detector transmits, using a communication device used in the in-vehicle emergency call system, information relating to whether the occupied seat is present detected inside the space to an emergency call center connected to an in-vehicle emergency call system.

10. An occupied seat detection method performed by an occupied seat detection device that includes a transmitter, at least one receiver, an acoustic characteristics analyzer, and a detector, the occupied seat detection method comprising:
transmitting one after another predetermined sounds to inside a space, the transmitting being performed by the transmitter;
receiving one after another reflected waves of the predetermined sounds transmitted by the transmitter, the receiving being performed by the at least one receiver;
based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer;
detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector; and
when an occupant is detected to be present or an occupied seat is detected to be present, calculating a position of the occupant detected or a position of the occupied seat detected and outputting a calculation result, the calculating and the outputting the calculation result being performed by the detector.

11. A non-transitory computer-readable recording medium having recorded thereon a program for causing an occupied seat detection device to perform occupied seat detection processes, the occupied seat detection device including a transmitter, at least one receiver, an acoustic characteristics analyzer, and a detector,
wherein the occupied seat detection processes include:
transmitting one after another predetermined sounds to inside a space, the transmitting being performed by the transmitter;
receiving one after another reflected waves of the predetermined sounds transmitted by the transmitter, the receiving being performed by the at least one receiver;
based on the predetermined sounds, calculating one after another temporal characteristics or frequency characteristics of sound in an internal space of a vehicle from (i) transmission signals representing respective waveforms of the predetermined sounds transmitted by the transmitter and (ii) at least one reception signal representing a waveform of each of the reflected waves of the predetermined sounds received by the at least one receiver, the calculating being performed by the acoustic characteristics analyzer;
detecting whether an occupant is present or whether an occupied seat is present in the space, based on a difference between (i) the temporal characteristics or the frequency characteristics of the sound in the internal space that are calculated by the acoustic characteristics analyzer based on one of the predetermined sounds transmitted by the transmitter at a first timing and (ii) the temporal characteristics or the frequency characteristics of the sound in the internal space that are calculated by the acoustic characteristics analyzer based on another one of the predetermined sound transmitted by the transmitter at a second timing, and outputting a detection result, the detecting and the outputting being performed by the detector; and
when an occupant is detected to be present or an occupied seat is detected to be present, calculating a position of the occupant detected or a position of the occupied seat detected and outputting a calculation result, the calculating and the outputting the calculation result being performed by the detector.

\* \* \* \* \*